United States Patent [19]

Cusick, III

[11] Patent Number: 6,005,221

[45] Date of Patent: Dec. 21, 1999

[54] PRESSURIZED AIR COOLED TUNGSTEN INERT GAS WELDING APPARATUS

[76] Inventor: Joseph B. Cusick, III, 1413 N. Estate Rd., Peck, Kans. 67120

[21] Appl. No.: 09/128,000

[22] Filed: Aug. 3, 1998

[51] Int. Cl.[6] ............................... B23K 9/00; B23K 9/32
[52] U.S. Cl. ............................... 219/137.62; 219/137.63
[58] Field of Search ........................... 219/137.62, 137.63

[56] References Cited

U.S. PATENT DOCUMENTS

| | | | |
|---|---|---|---|
| 2,473,258 | 6/1949 | Potter | 219/137.62 |
| 2,527,235 | 10/1950 | Tuthill | 219/137.62 |
| 3,980,860 | 9/1976 | Howell et al. | 219/130 |
| 4,297,561 | 10/1981 | Townsend et al. | 219/137.63 |
| 4,393,298 | 7/1983 | Frantzred, Sr. | 219/137.62 |
| 4,864,099 | 9/1989 | Cusick, III et al. | 219/137.63 |
| 5,248,868 | 9/1993 | Cusick, III | 219/137.62 |

OTHER PUBLICATIONS

DF Machine Specialties Inc. Space & Maintenance Manual—702 DF MIG Warecooled Guns, Dec. 5, 1972.

*Primary Examiner*—Patrick Ryan
*Assistant Examiner*—Anjan Dey

*Attorney, Agent, or Firm*—Bradley P. Sylvester

[57] ABSTRACT

An improved tungsten insert gas welder, having a means to remove heat energy using pressurized air, and a method for removing the heat away from the welder head area. A source of pressurized air is delivered though a hose to the welder head, and is directed through heat conductive air tubes within the welder head, is forced through a plurality of coils which surround an area that contains heat energy created during the welding process. As the air moves through the coils, it acquires some of the heat energy within the welder head. The heated air is vented into an outer jacket, which contains the electrically conductive cables, and an airspace surrounding the cables. As the heated air moves toward a rear connector block, it contacts the length of the cables, and is able to transfer some of the heat to the cables. This allows some of the heat energy contained within the pressurized air to be transferred through physical contact to the metal cable, so that as the air moves farther along the length of the metal cable, it will lose more of its heat energy, so that it begins to cool, which will cause the heat acquired by the metal cable to move along the length of the cable in the direction of the cooler air toward the rear connector block, thus maximizing the cooling potential of this forced air system.

17 Claims, 3 Drawing Sheets

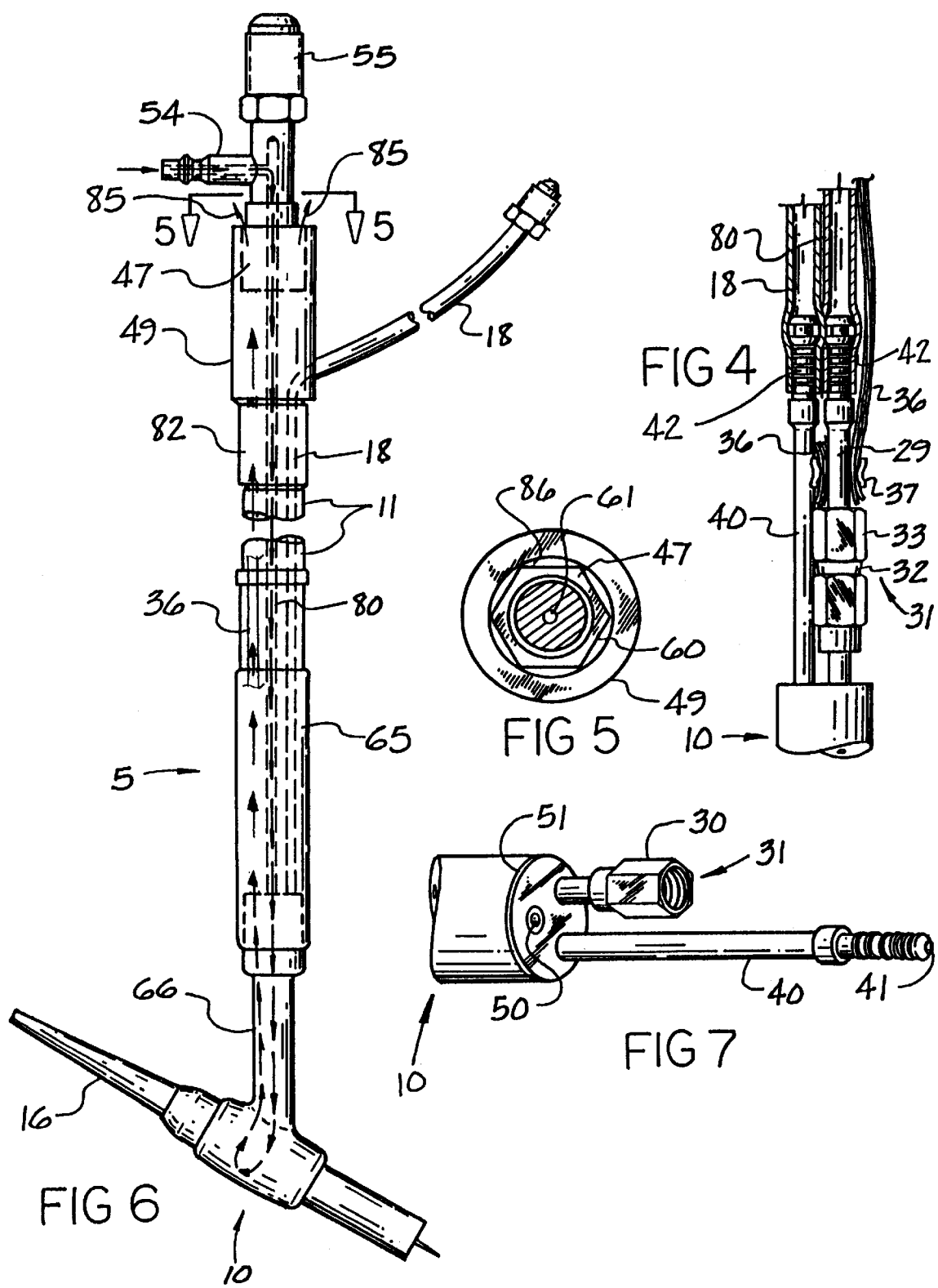

PRESSURIZED AIR COOLED TUNGSTEN INERT GAS WELDING APPARATUS

BACKGROUND OF THE INVENTION

Many prior arc welders have relied on heat exchange systems to dissipate and remove heat from the head of the welding apparatus. These heat exchange systems generally utilize water, which is pumped around the heat generating portion of the welding apparatus, and where the water is then sent to a cooling station, generally comprising a set of coils and a means to move air across the surface of said coils.

Water and other liquids require a water tight barrier between the water and other parts of the apparatus. Since arc welders themselves rely on electricity that has sufficient voltage to cause an arc, any introduction of water against the parts of the apparatus that are used to conduct electrical current, can cause shock to the operator, who is generally holding onto the apparatus. In addition, water circulating systems are high maintenance systems, since the liquid must be changed frequently and the used coolant must be disposed of according to any required environmental protection agency regulations.

Several other methods of cooling welding assemblies, involving the use of air cooling techniques, have been tried with varying degrees of results. The methods of the air cooling, provides a unique problem with welding guns, since an inert gas shield must still be provided during the welding process. Interruption of the flow of the inert gas, around the spot or point being welded, can cause poor quality welding.

This invention is an improvement on U.S. Pat. No. 5,248,868 entitled "Welding Gun" (Corrected from "Melding Gun"), issued on Sep. 28, 1993. In that invention, the use of rapidly moving air was shown, in which the air evacuated the head or front portion of the welding apparatus. The venting of the air, since it is so near the welding head, could cause problems and interrupt the welding process in the tungsten inert gas welding process. The present invention avoids the air circulation problems, and maximizes the cooling ability of the apparatus.

This invention is also on improvement on U.S. Pat. No. 4,297,561 entitled "Semi-automatic Welding Gun", issued Oct. 27, 1981. U.S. Pat. No. 4,297,561 describes an air cooled semi automatic welding gun assembly as contrasted with the present invention of an air cooled welding gun assembly, in which air is returned inside the outer jacket, adjacent to the copper cables, using the copper cables as a means; to further carry out excess heat, and venting the air at the rear connector block.

This invention is also an improvement on U.S. Pat. No. 4,864,099 entitled "Water Cooled Semi-Automatic Welding Gun", issued Sep. 5, 1989. U.S. Pat. No. 4,864,099 describes a water cooled welding gun assembly as further contrasted with the air cooled welding gun assembly described and claimed herein.

SUMMARY OF THE INVENTION

The present invention uses moving air to transport excess heat away from an improved welding gun head. Pressurized air is introduced at the base or rear end of the welding gun assembly, and is conducted through a flexible air delivery hose which directs the pressurized air from a rear connector block to the welding head. The flexible air delivery hose is contained within a jacket, which also contains electrical conductor cables, such as copper cables.

The flexible air delivery hose has a fitting inserted at both of its ends, with each fitting having a tubular extension, and preferably has raised ridges on the end, so that when the tubular extension is inserted into an air delivery hose, the elastic hose will grip the outer circumference of the raised ridges of the tubular extension. The fittings also have an area along its length where the ends of copper cables can be attached. Typically, the copper cables will have a pressure ring which effectively crimps the cables against the tubular extension. The copper cables are positioned so that they are adjacent to the air delivery hose.

The fittings are constructed out of an electrically conductive material, so that any electrical current that contacts the fitting, will be able to move unhindered through the fitting to any electrically conductive material that the fitting is attached to.

An air hose is attached at each end to the fittings, and each of the ends of the copper cables are likewise attached to the fittings, with the hose, cables, and fittings contained within an outer jacket. A rear fitting is attached to a rear connector block, which is in physical contact with the electrical input. The second fitting is attached to the base of the welder head.

At some point along the length of the outer jacket, a flexible inert gas delivery hose is introduced, and travels parallel to the air delivery hose and copper cables contained within the outer jacket. The inert gas delivery hose attaches to a fitting on the base of the welding head. Typically, this inert gas fitting is comprised simply of a tubular extension. For purposes of clarity, the pressurized air and gas is delivered to the tig welder head through flexible rubber "hoses", and the gas and air moving through the tig welder head portion of this apparatus is moving through metal "tubes."

The inert shield gas moves from the inert gas delivery hose into the welding head base, and moves upward through the welder head through an inert gas delivery tube, which is typically a rigid metal tube that directs the inert gas from the base of the welder head into a metal sleeve. The metal sleeve has internal threading, so that a tungsten rod holder is able to be screwed into the metal sleeve. The tungsten rod holder also functions as a gas diffuser, which directs the inert gas in the metal sleeve forward in the welding head into the shield sleeve, which causes the flow of the inert gas to surround the tip of the tungsten rod and the area being welded. This protects the welding area from contamination by oxygen gas during the welding process.

The pressurized coolant air, once it is delivered to the base of the welder head, moves upward through the welder head by way of an air delivery tube, which is generally constructed of the same metallic substance as the inert gas delivery tube. The air delivery tube and the inert gas delivery tube, being constructed out of metal, preferably copper, are both able to conduct electrical current, and both are in direct contact with the metal sleeve. Therefore any electrical current from the rear connector block, which travels through their rear fitting, then through the cables to the front fitting, and through the front fitting through the air delivery or inert gas tube, will then be able to move through the metal sleeve, into which the tungsten rod holder and tungsten rod are attached.

Surrounding the metal sleeve are a series of air tube coils, which are wrapped around the metal sleeve, so that the physical contact between the coils and the metal sleeve allows the heat energy to transfer easily between them. Heat from the tungsten tip, caused by the electrical arc, will move up through the tungsten rod, into the tungsten rod holder, and then into the metal sleeve. Heat energy stored in the metal sleeve will also transfer into the metal air tube coils.

As the air moves through the coils, heat energy which resides in the metal sleeve, and which has moved into the air coils, will be acquired by the moving air. This heated air will leave the coils and travel down an air discharge tube to the base of the welder head to an exit port at the base of the head assembly. The exit port allows the heated air to vent directly into the interior of the outer jacket containing the air hose, inert gas hose and copper cables.

The heated air moves backwards along the interior of the outer jacket, moving adjacent to the air delivery tube, the inert gas tube, and the various copper cables. As this heated air moves along the copper cables, some of the latent heat will be transferred to the copper cables. The continual movement of heated air backwards through the outer jacket, will cause the cables to absorb significant amounts of heat. The cables themselves serve to assist in the overall movement of heat backwards along the length of this apparatus, in that the excess latent heat energy will be continually moving along the copper cables towards the cooler air closer to the rear connector block. The air discharge opening is located between a series of gaps defined between the rear connector block and a tubular plastic portion of the apparatus. The rear connector block defines a series of gaps, being the spaces created when the hexagon shaped rear connector block is fitted tightly within a tube having a round inner circumference, where the straight edges of the hexagon shaped rear connector block do not completely conform with the shape of the tube. These series of gaps provide a sufficient vent opening, so as to allow the necessary amount of the air to exit the assembly, but where a slight pressure is maintained within the outer jacket. This slight elevation in air pressure within the outer jacket, causes the air passageways along the link of the outer jacket to remain inflated and the size of the air space fairly uniform, thereby allowing the entire length of copper cables to be continually subject to contact to air flow.

Accordingly, it is an object of this invention to provide an improved welder assembly, in which pressurized air is used to remove excess heat generated during the welding process.

It is a further object of this invention, to provide an improved welder assembly, in which air that has accumulated waste heat from the welding head, is vented and discharged away from the welding head.

It is a further object of this invention, to provide and improved welder assembly, in which the electrical conductive copper cables are used to further facilitate the transfer of excess heat from the welding head backwards along the assembly.

BRIEF DESCRIPTION OF THE DRAWINGS

FIG. 2A shows a cross-sectional view of the outer jacket of the welding apparatus, showing the relative positions of the cables, air delivery hose, and inert gas hose, which defines and air space between them through which heated air is able to move through.

FIG. 4 shows the fittings located at the base of the welding head, in which the tubular extensions and respective hoses arc shown, with the copper cables being crimped to the air delivery hose fitting.

FIG. 5 is a cross-sectional view of the plastic rear case with a rear connector block situated therein, depicting the gaps through which the heated air is vented and released from the apparatus.

FIG. 6 is a full view of the welding gun assembly, in which a portion of the total length of the outer jacket and contents are shown deleted, but where said figure indicates the direction of the flow of air, and the view for FIG. 5.

FIG. 7 depicts the base of the arc welding head, showing the tubular extensions of the air delivery fitting, and the inert gas fitting and heated air vent.

DETAILED DESCRIPTION

Figure 1:
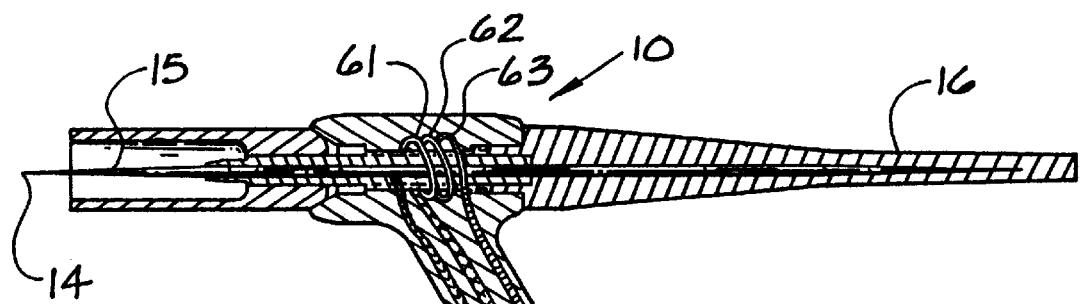
FIG. 1 depicts a cross sectional view of the welding gun head, showing the coils and the various connectors for the air delivery and inert gas hoses, as well as the air delivery tube, the air discharge tube, and the inert gas delivery tube.
Figure 10:
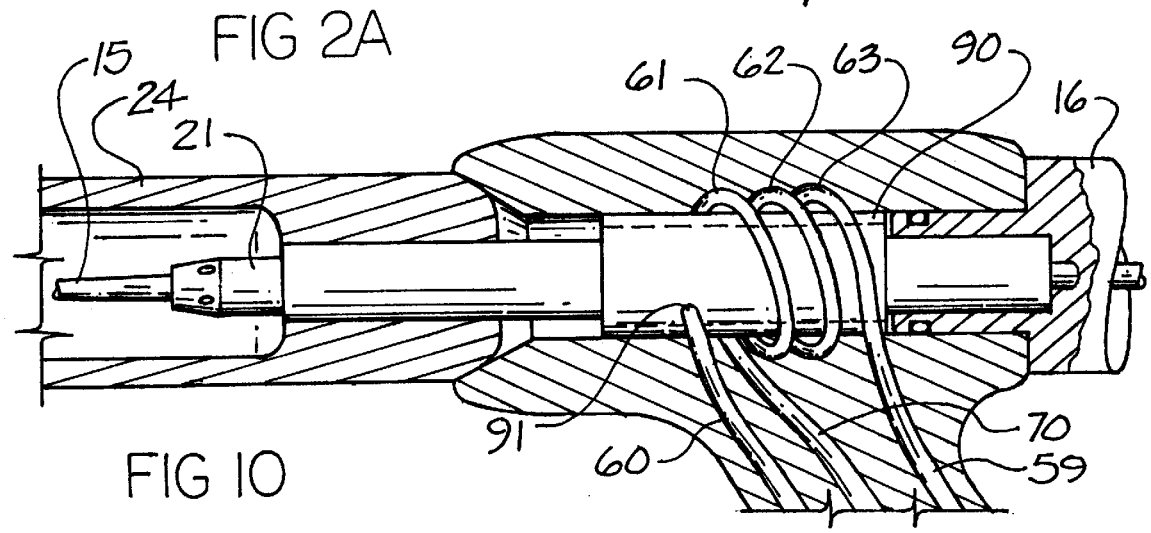
FIG. 10 is a partial view of the tungsten inert gas welder head, showing the metal sleeve to which inner gas is delivered, and where the heat exchange occurs between the metal sleeve and the air tube.

Referring now to FIG. 1 and FIG. 10, a welding head, utilizing tungsten inert gas ("tig") hereinafter referred to as a "tig torch head" 10 is shown. The tig torch head 10 is comprised of a centrally located metal sleeve 90 located within the tig torch head 10, and a means to hold a tungsten rod 15. The metal sleeve 90 is generally threaded internally on both ends, and allows a tungsten rod holder 21 to be fitted into the metal sleeve 90 on one (front) end, and a rod cap 16 is able to be screwed into the metal sleeve 90 on the other (rear) end of the metal sleeve 90. The rod cap 16 defines a hollow interior, which when placed over a rod 15, not only protects the rod 15, but also insulates the rod 15 from other objects, since the rod 15 is supplied with electrical current. Inert gas is fed into the metal sleeve 90, through the aperture 91 (shown in FIG. 10) to which an inert gas delivery tube 60 is attached.

The tip 14 of the tungsten rod 15, when provided with sufficient electrical current, and placed in close proximity to another metallic surface of electrically conductive material, where said conductive material is grounded so as to make it part of a circuit, will cause the electric current to jump across the gap between the tip 14 end of the electrically conductive material, causing an electric arc. Such electric arcs, produce intense heat, and is well known as a suitable welding method, where welding material can be introduced into the electrical arc.

It is further well-known in the art to provide a shielding means, where oxygen is denied contact with the tip 14 and electric arc. A continuous flow of inert gas is the common means used to provide this shield. The inert gas is delivered through a circular nozzle, so that a thin wall of inert gas will completely surround the tip 14 when being used in the welding process. The inert gas typically is provided through the tig torch head 10, having been acquired from a pressurized source.

Since high temperatures are reached during the welding process, at the tip 14 of tungsten rod 15, and since said tungsten rod 15 is conductive of both electrical current and heat generated during the welding process, the entire tig torch head 10 will acquire excess heat as the heat energy moves from the tip 14 along the length of the tungsten rod 15, which allows the energy to move into the tungsten rod holder 21. The heat then is able to transfer into the metal sleeve 90. Unless the heat energy is able to be removed from the metal sleeve 90, the entire tig torch head 10 may acquire more heat energy than it can handle. This excess heat can pose a problem to the tig torch head 10 as well as to an operator of this apparatus, if the heat goes beyond tolerance limits of the tig torch head 10, or beyond that of the operator's comfort.

Referring again to FIG. 1 and FIG. 10, a series of coils 61, 62, and 63 encircle the metal sleeve 90. The coils 61, 62, and 63, comprise the middle portion of an air tube, which is comprised of three separates portions, being an air delivery tube 59, which delivers air through the tig torch head to the coils 61, 62, and 63, which then direct air that has acquired heat energy into an air discharge tube 70. The location of the actual heat transfer, from the tig welder head 10 to the moving air, is at the location where said coils 61, 62, and 63 encircle the metal sleeve 90.

All portions of the air tube 59, 61, 62, 63, and 70, are preferably comprised of a material that is both highly conductive of the heat, as well as electrical current. Typically, the material used is copper tubing, since copper is highly conductive of electricity. Coils 61, 62, and 63 are in actual physical contact with the metal sleeve 90, which is also electrically conductive, along with the tungsten rod holder 21 and the tungsten rod 22. Therefore, any electrical current introduced to the air delivery tube 59, will be able to flow to the tungsten rod 22.

When a pressurized cooling gas, such as ordinary air, is delivered to the air delivery tube 59, and allowed to move through coils 63, 62, and then 61, the cooling gas will acquire some of the heat energy which is retained in the walls of the tubing that is in physical contact with the metal sleeve 90. It is only necessary that the coils 63, 62 and 61 be in close proximity to an area of heat retention within the welding head 10. A single coil 63 may be used, but preferably more than one coil 63, 62 and 61 are used, so as to allow the moving air within the coils 63, 62 and 61 to acquire a maximum amount of heat energy. The heated air will then move through the air discharge tube 70 and exit the tig welder head 10. The cooling gas is typically simple pressurized air, which is delivered at a slightly elevated pressure, as related to the standard atmospheric pressure surrounding the tig welder apparatus 5, so that a constant flow of the air through the coils 63, 62, and 61, is maintained. The amount or flow rate of pressurized air can be controlled so as to remove unwanted heat energy from the tig welder head 10 at any desired rate.

Referring also now to FIG. 7, a perspective view of the tig torch head base 51 is shown, where FIG. 7 also shows the various openings through which pressurized gases are delivered and vented. The tig torch head base 51 has a protruding air delivery line connector/receptor 30, which is able to receive a fitting 29, which is located on the end of an air delivery hose 80, and is discussed in greater detail below. The air delivery line connector/receptor 30 has an outer side shape which has several flat edges, which allow the delivery line connector/receptor 30 to be rotated. The delivery line connector/receptor 30 is equipped with a threaded socket 31 having an opening which leads to the air delivery tube 59 in the tig torch head 10. The delivery line connector/receptor 30 is constructed of a material that it is electrically conductive, so that any electrical current contacting the connector/receptor 30, is able to travel through it, and through the air delivery tube 59 to the tungsten rod 15. The manner in which the connector/receptor 30 accepts the fitting 29 is shown in greater detail in FIGS. 8 and 9.

When pressurized air enters into the tig torch head 10, it moves through the air delivery tube 59, into the coils 63, 62, and 61, and back through the air discharge tube 70 to the discharge vent 50. As shown in FIG. 7, a tig torch head 10 air discharge vent 50 is shown, and is defined as a small hole, which functions as the exit port for the air discharge tube 70. Air passing through the discharge vent 50 is expelled from the tig torch head 10, back into the interior of the outer jacket 11.

Also shown in FIG. 1 and FIG. 10, is an inert gas delivery tube 60, which receives pressurized inert gas at the base 51 of the tig torch head 10, and directs the flow of said gas through the opening 91 defined by the metal sleeve 90 to the tungsten rod holder 21, which functions as a nozzle located within the shielding barrel 24.

Referring now to FIG. 1 and also to figure the 7, the tig torch head base 51 is provided with a tubular extension 40 that is able to receive an inert gas delivery hose 18. As is shown also in FIG. 4, the end of said hose 18 is impaled upon nipple 42, which is located on the end of the tubular extension 40, where the nipple 42 defines a series of raised ridges, which assist in the gripping of the inert gas delivery hose 18. The terminating end of the tubular extension 40 defines a centrally located opening 41 which allows gas from the inert gas delivery hose 18 to move through the tubular extension 40 into the tig; torch head 10, and through the inert gas delivery tube 60 to be metal sleeve 90.

Figure 3:
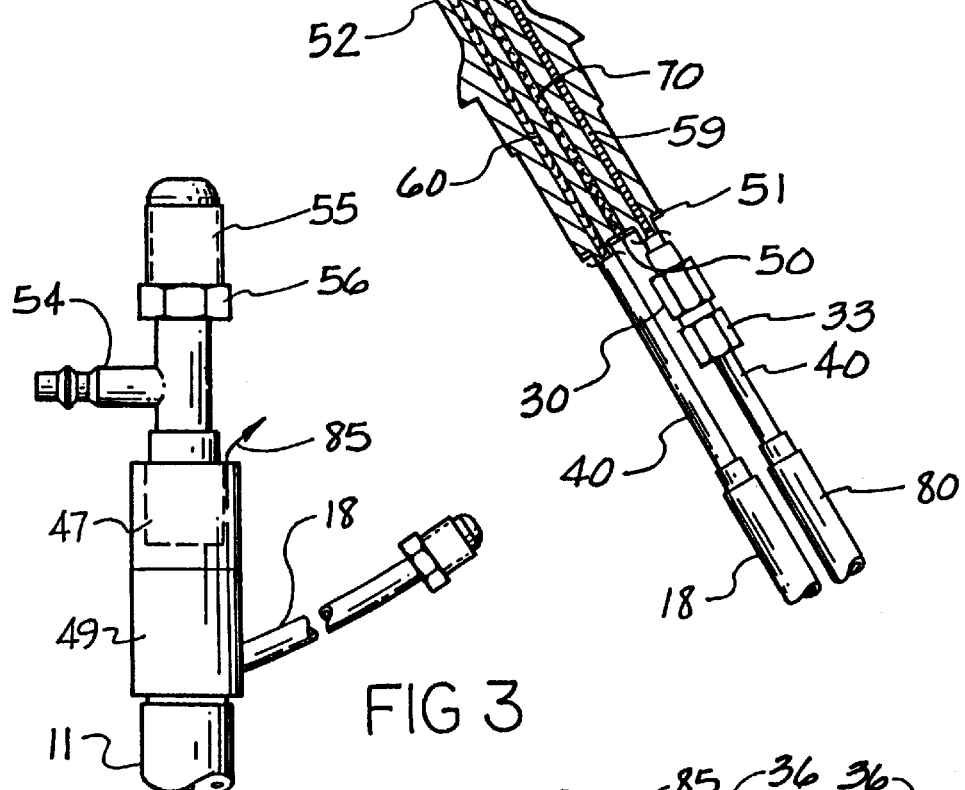
FIG. 3 depicts the rear portion of this apparatus, showing the location of the connector block, air connector and electrical connector, along with the source line for the inert gas.
Figure 2:
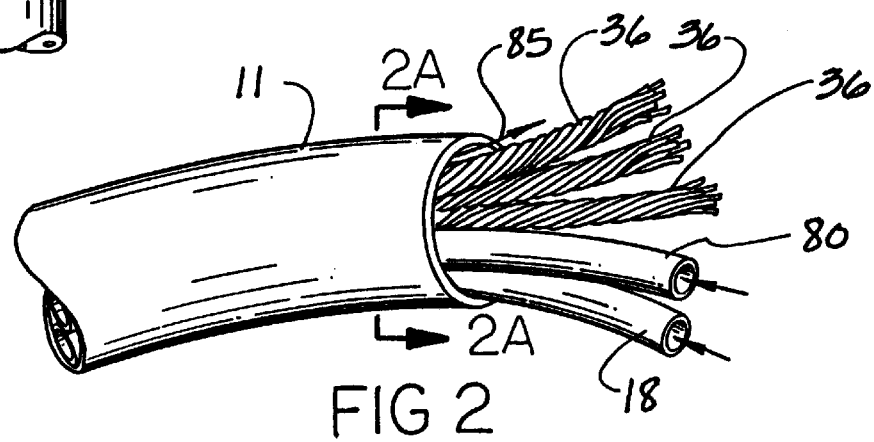
FIG. 2 is a perspective view showing a cut-away view of the outer jacket of the welding apparatus, depicting the cables, air delivery hose, and inert gas hose.

Referring now to FIG. 6 and FIG. 3, a means to attach the apparatus 5 to an electrical source and to a pressurized air source is shown. Generally, the electrical source is provided with a threaded socket into which the electrical connector jack 55 can be screwed into. The electrical jack 55 has a hexagon shaped lip 56 which assists in turning the electrical connector jack 55 when it is being placed into the threaded socket of the electrical source.

Referring now to FIGS. 3, 5 and 6, a pressurized air input nipple 54 defines an air passage which extends from the end of said nipple 54, to the rear connector block 47. The rear connector block 47 preferentially has a hexagon shape, with a plurality of straight edge sides 60. The rear connector block 47 is placed within the confines of an insulating rear plastic sleeve 49, as shown in FIG. 5, so that the straight edges 60 define small gaps 86 between the straight edges 60 and the interior side of the rear plastic sleeve 49. Where the plastic sleeve 49 is not used, the outer jacket 11 will have the rear connector block 47 placed directly into it, so that, referring again to FIG. 5, the outer jacket 11 will occupy the position of the rear plastic sleeve 49 as shown in FIG. 5. The rear connector block 47 also defines an air hole 61 which allows air to move into the air hose 80 which extends through the outer jacket 11, so that the air can be delivered to the tig torch head 10.

Figure 8:
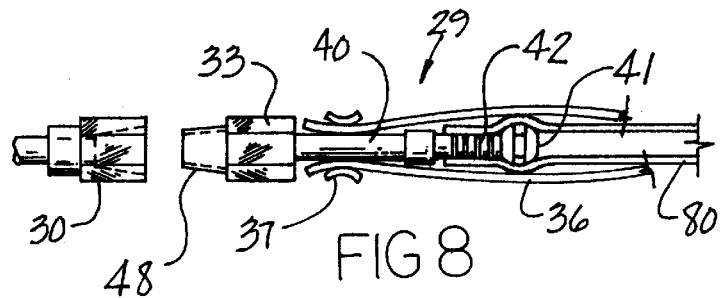
FIG. 8 is an enlarged view of the front fitting, used with the air delivery hose, showing the copper cables crimped to the tubular extension of the fitting, with the end of the fitting having been placed within the air delivery hose, with a connector/receptor that protrudes from the welding torch head.
Figure 9:
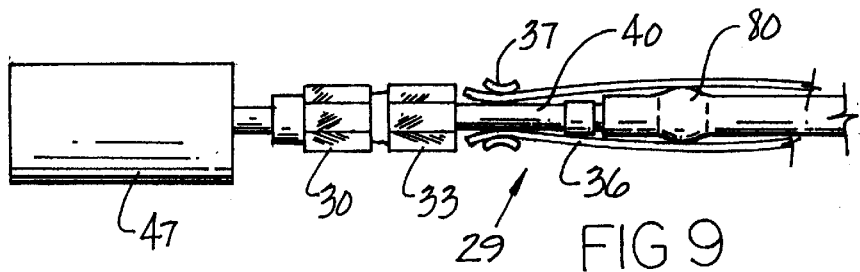
FIG. 9 is an enlarged view of the rear fitting, and where it is shown having been attached to the rear connector block, with the tubular extension having been inserted within the air delivery hose, and where the copper cables are attached to the fitting.

Referring also to FIG. 9, the rear connector block 47 defines a threaded socket area 48 and has a channel through it, so that any air introduced into the threaded socket portion 48 will be able to move through the rear connector block 47 into the air hose 80 contained within the outer jacket 11. FIG. 8 depicts the manner in which a threaded head 33 is oriented with regard to a threaded socket 30, prior to their being attached.

Referring now to FIGS. 8 and 9, an air delivery hose 80 and electrically conductive cables 36 are attached at their ends to fittings 29 that connect to the rear connector block 47 and to the base of the tig welder head 10. The air delivery hose 80 is preferably constructed of a flexible tube, that is resistant to the passage of air through its side walls, and which has some capability to withstand heat.

Each end of the air delivery hose 80 has positioned within it a fitting 29 which has a tubular extension 40, and a threaded head 33, which is able to be screwed inside a threaded socket 30, or into a threaded socket area defined by the rear connector block 47. Each fitting 29 is made of an electrically conductive material, and with an end which preferably has raised ridges 42 which encircle the end of the tubular extension 40. Each fitting defines an air passageway which extends from the opening 41 located at the end of the tubular extension 40, and continuing through the fitting 29 to the end of the threaded head 33. The fitting 29 acts as a nozzle for the air hose 80, so that when the air hose 80 has a fitting 29 inserted into it, any pressurized air within the air hose 80 will be able to move through the fitting 29 into the next connected part of the apparatus 5.

Referring now to FIG. 9, the air hose 80 has the tubular extension 40 of fitting 29 (also referred to as a "rear fitting" when used in conjunction with the rear connector block) is inserted into the air hose 80 open end. The ridges 42 assists in the gripping of the inner surface of the air hose 80. The opening 41 is therefore positioned within the interior of the air hose 80, so that it is able to receive any pressurized air within said hose 80. A portion of the tubular extension 40 extends out of the end of the air hose 80, with the threaded head 33 of the fitting (rear fitting) 29 able to be screwed into the threaded socket portion 48 of the rear connector block 47. Electrically conductive cables 36 are positioned so that they are adjacent to the length of the air hose 80. The ends of the cables 36 are made to contact and be attached to the exposed tubular extension 40 of the fitting 29, and a crimping ring 37 and circles the tubular extension 40 and cables 36, with the crimping ring 37 applying pressure to the cable ends 36 so that they are pressed tightly against the tubular extension 40.

Referring now to FIG. 8, the other end of the air hose 80 has a fitting (also referred to as a "front fitting" when used in conjunction with the tig welder head 10) 29 inserted within it in the same manner as described for FIG. 9. The fitting (front fitting) 29 for this end of the air hose 80 screws into the socket 30 which is attached to the base 51 of the tig welder head 10. When the fittings are attached to the rear connector block 47 and also to the threaded socket 30 of the base 51 of the tig welder head 10, the electrically conductive cables 36 allow electric current to pass from the rear connector block 47 to the socket 30 on the base of the tig welder head 10. Electric current that reaches the front socket 30, is able to been move up through the air tube 59 to the tungsten rod 15 itself. The combination assembly of the air hose 80, cables 36, and fittings 29 which are attached to each end of the cables 36 and the air hose 80, provide a single unit that allows both pressurized air and electrical current to be transferred from the rear connector block 47 to the tig welding head 10, with the air hose 80 and cable 36 assembly able to be replaced by simply unscrewing the front and rear fittings 29 and replacing with a new assembly of fittings 29, air hose 80 and cable 36.

The tig torch head 10 is attached electrically to the rear connector block 47 through the air hose 80, and cables 36. These items are surrounded by a tubular casing, where said tubular casing comprises an outer jacket 11, which is generally constructed of a rubber or plastic material hose having flexibility so that it can bend or twist along its length. The outer jacket 11 may have a separate plastic front case 65, which acts as an additional sleeve that surrounds the outer jacket 11 in which provides additional strength to the attachment point of the outer jacket 11 to the tig torch head 10. A separate plastic rear case 49 may also be present, acting as a secondary supportive layer that provides additional strength to the outer jacket 11, as well as insulating qualities.

Referring now to FIG. 6, an inert gas hose 18 enters through the side wall of the outer jacket 11, and travels along the length of the air hose 80 and cables 36 to the base of the tig welder head 10. The inert gas hose 18 may also enter into the confines of the outer jacket 11 through the rear plastic connector 49, if one is being used. The inert gas hose 18 attaches directly to the base of the tig welder head 10, in which the tubular extension 40 as shown in FIG. 7 is inserted into the inert gas hose 18. When both the fitting 29 and inert gas hose 18 are attached to the base of the tig welder head 10, they will be oriented as shown in FIG. 4, with both the air delivery hose 80 and inert gas hose 18 being positioned so that they are adjacent to one another, and also adjacent to cables 36.

Figure 2A:
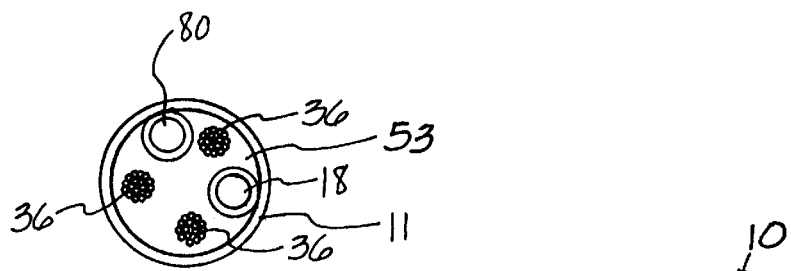

Referring now to FIG. 2A, a cross sectional view of the cables 36, air hose 80 and inert gas hose 18 is shown in their relative positions within the outer jacket 11. The outer jacket 11 defines an interior tubular space, which is only partially occupied by the cables 36 air hose 80 and inert gas hose 18. The remaining volume comprises an air space 53, whose cross-sectional size is dependent on the size of the space defined by the outer jacket's 11 inner side, which is not currently occupied by the tubes 18 and 80 and cables 36 contained therein.

The outer jacket 11 may be attached to be tig torch head 10 by a plastic front case 65, which fits over the base of tig torch head 10, so that base portion is inserted within the plastic front case 65. Both in the plastic rear case 49 and the plastic front case 65 function as rigid sleeves. The plastic rear case 49 fits over a portion of the rear connector block 47, in the same manner as described for the plastic front case 65 and welding head 10.

Pressurized air, once introduced into the apparatus 5 will travel from the rear connector block 47, through air hose 80 and fittings 29, to the tig welder head 10 front socket 30, and where the air is then directed through the air delivery tube 59, through the coils 63, 62, and 61, where the air acquires the heat energy created by the welding process and which has traveled up the tungsten rod 15 to the metal sleeve 90. The heated air will then travel down the air discharge tube 70 and be vented through aperture 50 directly into the air space 53 of the outer jacket 11. The heated air will then move from the base 51 of the tig welder head 10 to the rear connector block 47 by way of the airspace 53 confined in the outer jacket 11. As the heated air moves through the outer jacket 11, some of the heat energy will be transferred to the cables 36 that the air is flowing around. The cables 36 themselves will serve to assist in the movement of the heat away from the tig welder head 10, as the heat flows toward the connector block 47 through both the cables 36 and moving air. The moving air travels through the air space 53 as shown in FIG. 2A, so that the cables 36 remain in constant contact with the heated air.

When the heated air reaches the rear connector block 47, it will exit the outer jacket 11 through the gaps 86 defined as the space between the rear connector block 47 and the rear plastic case 49. The heated air will move out of the apparatus 5 in direction 85 as shown in FIG. 6. The heated air is discharged from the apparatus 5 at a point that is as far from the tig welder head 10 as possible. This alleviates any problems that might be associated with any interference of the flow of inert gas around the welding point or with any discomfort or irritation to the operator.

As the pressurized air enters into the plastic front case 65, it contains high levels of heat energy. Since this heated air comes into direct contact with cables 36, the transfer of heat from a higher energy state is immediately able to be transferred to the cables 36 having a lower energy state. Therefore, when the heated air has a higher temperature than the cables 36 that the heated air is contacting, said cables 36 will acquire the heat until they reach a similar temperature or equilibrium of energy level as the air.

Air moving backwards through the interior of the outer jacket 11, from the plastic front case 65 toward the plastic rear case 49, will conduct the heat away from the plastic front case 65 toward the plastic rear case 49. As heated air moves through the space 53, the copper cables 36 will decrease in temperature towards the plastic rear case 49. Therefore, as heated air moves through the space 53 of the outer jacket 11, the cables 36 will be constantly encountering air having a higher temperature, so that the air will constantly be transferring its heat energy to the cables 36 until an equilibrium is reached. As the cables 36 continue to acquire heat energy, they will gain a higher energy than the cable 36 portion toward the rear connector block 47, which will causes heat to actually move through the cables 36 themselves toward the rear connector block 47. Eventually, the cables 36 will have acquired sufficient amounts of heat energy, so that the air which reaches the rear connector block 47 retains most of its waste heat energy that it obtained in the coils 63, 62, 61 in the tig torch head 10. Since the cables 36 will always be losing heat energy through the adjacent air which is immediately exiting the apparatus 5, the cables 36 will continue to transfer heat along with the air out of the outer jacket 11 of the welding apparatus 5. Therefore, any air that is released or vented from the plastic rear case 49 or outer jacket 11, will be taking with it a maximum amount of latent heat energy.

For further clarification, the general direction of the flow of air is shown by various arrows 66 as shown in FIG. 6, which depict the general direction of air flow and location of air venting to the atmosphere 85 as it moves through and out of the apparatus 5.

From the foregoing statements, summary and description in accordance with the present invention, it is understood that the same are not limited thereto, but are susceptible to various changes and modifications as known to those skilled in the art and we therefore do not wish to be limited to the details shown and described herein, but intend to cover all such changes and modifications which would be encompassed by the scope of the appended claims.

I claim:

1. A welding apparatus, having an improved means to remove heat from the welding head, comprising:
   a. A welding head, capable of holding a tungsten rod;
   b. An outer jacket, which is fixed to the welding head, having an elongated cavity;
   c. An air delivery tube capable of transporting pressurized air to at least one coil, which surrounds an area that acquires heat in the welding head during the welding process, and where each coil is defined by a tube having walls that are capable of absorbing heat energy from the metal sleeve, so that pressurized air moving through the air coils can acquire heat energy from the coil walls;
   d. A means to discharge heated air from the welding head into the outer jacket; and
   e. A vent opening for the discharge of heated air back into the atmosphere.

2. A welding apparatus, having an improved means to remove heat from the welding head, as described in claim 1, in which the outer jacket comprises a flexible tube, surrounding at least one electrically conductive cable, which also has the capability to absorb and transfer heat energy along its length, and an air space defined by the unoccupied area within the outer jacket, where the air space allows air to move along the length of the outer jacket's interior through said air space.

3. A welding apparatus, having an improved means to remove heat from the welding head, as described in claim 1, in which the plurality of coils, defined by the air tube, physically contact a metal sleeve.

4. A welding apparatus, having an improved means to remove heat from the welding head, as described in claim 1, in which the means to discharge air that has become heated while moving through the coils into the outer jacket comprises a vent opening, defined by the welder head, which allows air that has become heated while moving through the coils to discharge directly into an airspace defined by the outer jacket.

5. A welding apparatus, having an improved means to remove heat from the welding head, as described in claim 1, in which the vent opening for the discharge of heated air back into the atmosphere comprises a rear connector, disposed within the confines of the outer jacket, with a series of gaps defined between the rear connector and outer jacket.

6. A welding apparatus, having an improved means to remove heat from the welding head, as described in claim 1, in which the vent opening for the discharge of heated air back into the atmosphere is located between the rear connector block and the outer jacket.

7. A method of removing heat from a welding head, comprising the following steps:
   a. Directing pressurized air through an air tube coil, so that the pressurized air acquires some of the heat energy in the welding head;
   b. Venting the heated air into the confines of an outer jacket, which is connected to the welding head, and which contains an air space and at least one metal cable, which extends through the length of the outer jacket, and where said metal cable is capable of conducting heat along its length;
   c. Moving the heated pressurized air along the length of the outer jacket within the air space towards a rear connector block, so that the air contacts the surface of the metal cable, which allows some of the heat energy contained within the pressurized air to be transferred through physical contact to the metal cable;
   d. Venting the pressurized air and any heat energy it carries with it out of the outer jacket.

8. A method of removing heat from a welding head, as recited in claim 7, in which when moving the heated pressurized air along the length of the outer jacket within the air space towards a rear connector block comprises an additional step of:
   restricting the venting of the air from the outer jacket, so that an increased air pressure in created within the confines of the outer jacket, so as to maintain air spaces around any cables within the outer jacket, so as to maximize contact between said cables and moving air.

9. A welding apparatus, having an improved means to remove heat from the welding head, comprising:
   a. A welding head, capable of holding a tungsten rod;
   b. An outer jacket, which is fixed to the welding head, having an elongated cavity;
   c. An air delivery tube capable of transporting pressurized air to at least one coil, which surrounds an area that acquires heat in the welding head during the welding process, and where each coil is defined by a tube having walls that are capable of absorbing heat energy from the metal sleeve, so that pressurized air moving through the air coils can acquire heat energy from the coil walls;
   d. A detachable delivery system for pressurized air and electrical current, which is fixed at one end to a rear connector block, and at its other end to the welding head;
   e. A means to discharge heated air from the welding head into the outer jacket; and
   f. A vent opening for the discharge of heated air back into the atmosphere.

10. A welding apparatus, having an improved means to remove heat from the welding head, as described in claim 9, in which the means to discharge air that has become heated while moving through the coils into the outer jacket comprises a vent opening, defined by the welder head, which allows air that has become heated while moving through, the coils to discharge directly into the outer jacket.

11. A welding apparatus, having an improved means to remove heat from the welding head, as described in claim 9, in which the vent opening for the discharge of heated air back into the atmosphere comprises a gap defined by the space between a rear connector and the outer jacket.

12. A welding apparatus, having an improved means to remove heat from the welding head, as described in claim 9, in which the means to assist in the conduction of heat along the length of the outer jacket comprise:

Electrically conductive cables, capable of conducting heat energy, where each end of the cables are made to contact and attach to the exposed extension of a fitting, and where the cables are caused to be placed within the outer jacket, with heated air able to move through the outer jacket's air space, so as to cause heat energy to be transferred to the cable.

13. A detachable means to transfer electrical current and air pressure between a rear connector block and a welding head, comprising an outer jacket, that when attached to the rear connector block defines a gap between said rear connector block and the outer jacket, which allows air within to outer jacket to vent through said gap, with the outer jacket enclosing:
   a. An air hose;
   b. A front fitting, having a tubular extension which is inserted into one end of the air hose, where the fitting defines an air passageway through the length of said fitting;
   c. A rear fitting, having a tubular extension that which is inserted into the other end of the air hose, where the fitting defines an air passageway through the length of said fitting and;
   d. A cable, capable of conducting electrical current, which is attached at one end to the front fitting, and at the other end to the rear fitting, so that electrical current can flow between the fittings.

14. A detachable means to transfer electrical current and air pressure between a rear connector block and a welding head, as recited in claim 13, in which the cable, capable of conducting electrical current, is attached to each fitting by a crimping means, which presses the cable against the tubular extension of the fitting.

15. A detachable means to transfer electrical current and air pressure between a rear connector block and a welding head, as recited in claim 13, in which a plurality of cables are attached between the fittings.

16. A detachable means to transfer electrical current and air pressure between a rear connector block and a welding head, as recited in claim 13, in which the rear fitting has a threaded head that can be inserted into a threaded socket on the rear connector block.

17. A detachable means to transfer electrical current and air pressure between a rear connector block and a welding head, as recited in claim 13, in which the front fitting has a threaded head that can be inserted into a threaded socket on the welding head.

* * * * *